US011902278B2

(12) United States Patent
Zafar et al.

(10) Patent No.: US 11,902,278 B2
(45) Date of Patent: Feb. 13, 2024

(54) AUTHORISING OPERATIONS FOR DEVICES IN A NETWORK

(71) Applicant: NAGRAVISION SA, Cheseaux-sur-Lausanne (CH)

(72) Inventors: Mohammad Tariq Zafar, Bangalore (IN); Ritwik Chattopadhyay, Bangalore (IN); Vaidyanathan Ramachandran, Bangalore (IN)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 408 days.

(21) Appl. No.: 17/294,941

(22) PCT Filed: Nov. 20, 2019

(86) PCT No.: PCT/IB2019/001261
§ 371 (c)(1),
(2) Date: May 18, 2021

(87) PCT Pub. No.: WO2020/104853
PCT Pub. Date: May 28, 2020

(65) Prior Publication Data
US 2022/0021674 A1 Jan. 20, 2022

(30) Foreign Application Priority Data
Nov. 20, 2018 (EP) .................... 18207418

(51) Int. Cl.
H04L 9/40 (2022.01)
G16Y 30/10 (2020.01)
H04L 67/12 (2022.01)
(52) U.S. Cl.
CPC ............. *H04L 63/10* (2013.01); *G16Y 30/10* (2020.01); *H04L 67/12* (2013.01); *H04L 2463/082* (2013.01)

(58) Field of Classification Search
CPC ... H04L 2463/082; H04L 67/12; H04L 63/10; G16Y 30/10
See application file for complete search history.

(56) References Cited

U.S. PATENT DOCUMENTS 9,798,883 B1 * 10/2017 Gil ...................... H04L 63/1433
9,824,096 B2 * 11/2017 Kobayashi ............ H04W 4/029
(Continued)

*Primary Examiner* — Gary S Gracia
(74) *Attorney, Agent, or Firm* — POLSINELLI LLP

(57) ABSTRACT

The disclosure related to methods and associated devices and/or systems for authorising at least one operation associated with a device, the device operating in a communication network, such as a user network, that comprises a plurality of devices communicatively coupled to a server computer, such as a control server. The disclosed method comprises generating a data model based on a plurality of patterns of actions for one or more devices among the plurality of devices. The data model is configured to detect and/or store at least one regular pattern of actions for each device among the one or more devices, each action corresponding to an operating state of the device. The disclosed method comprises receiving a request for an operation associated with a first device among the plurality of devices and determining if the received request satisfies a first criterion, the first criterion being based on or associated with the data model. Then, based on a determination that the first criterion is not satisfied, the disclosed method comprises generating at least one query based on a regular pattern of actions of at least one device among the one or more devices and sending the at least one query to a user interface. The disclosed method comprises determining if a response to the at least one query received from the user interface satisfies a second criterion. The second criterion is based on a comparison of the response received with the regular pattern of actions associated with the query in the data model. Then, based on a determination that the second condition is satisfied, the disclosed method comprises authorising the (Continued)

received request for the operation and providing a setting for the first device and/or control server based on the authorisation.

20 Claims, 8 Drawing Sheets

(56) References Cited

U.S. PATENT DOCUMENTS

| | | | |
|---|---|---|---|
| 10,057,227 B1* | 8/2018 | Hess | G06F 21/31 |
| 10,108,791 B1* | 10/2018 | Masterman | G06F 21/316 |
| 10,929,798 B1* | 2/2021 | Kinney | G06Q 10/06398 |
| 2014/0370879 A1* | 12/2014 | Redding | H04M 3/42178 |
| | | | 455/419 |
| 2015/0373051 A1* | 12/2015 | Dayan | H04L 63/0861 |
| | | | 726/4 |
| 2016/0110528 A1* | 4/2016 | Gupta | G06F 21/577 |
| | | | 726/19 |
| 2016/0180621 A1* | 6/2016 | Desinor, Jr. | G07C 9/00309 |
| | | | 340/5.61 |
| 2017/0085658 A1* | 3/2017 | Todd | H04L 67/306 |
| 2019/0190743 A1* | 6/2019 | Vishnumolakala | H04L 12/2827 |
| 2019/0372987 A1* | 12/2019 | He | H04L 63/1416 |
| 2022/0021674 A1* | 1/2022 | Zafar | H04L 67/12 |

* cited by examiner

AUTHORISING OPERATIONS FOR DEVICES IN A NETWORK

FIELD

The present disclosure relates to authorising operations associated with one or more devices in a communication network.

BACKGROUND

The Internet of Things (IoT) is a network of devices that allow the direct integration of the physical world with computer-based systems and networks. The devices are generally considered to be physical devices that have unique identifiers and are in most cases embedded with electronic sensors and/or actuators to monitor specific kinds of data. The devices are typically connected with private and/or public networks, which allow the live transfer and exchange of data with other connected devices and servers. A primary application of an IoT network is an automated system whereby information from the physical world can be stored, accurately monitored and processed for real-time decisions.

The key to IoT implementation is the interconnectedness of devices. Existing frameworks for enabling an IoT network of devices provide a software platform that can automatically organise communication between devices and networks, as well as manage security, privacy, data storage and bandwidth available for the connected devices. These requirements are generally met by predefined protocols in each IoT framework. In practice, this means that an IoT system can comprise millions of devices that communicate between themselves and other networks. Some examples of existing IoT frameworks include RTI™, Microsoft Azure™ IoT, Cisco™ IoT Cloud and the like.

Integrating and registering and/or authenticating several devices for connection to an IoT network requires a significant amount of manual or automated functions to register each device in the IoT network, generally for security reasons. This typically includes input of device credentials, network passwords, authentication codes and other security parameters. IoT frameworks employ known secure authentication mechanisms for registering a device with an IoT server or hub, so that one or more sessions can be set up, or requests can be received to operate or request a service from a device within an IoT network. However, although such a device or session is authenticated for the IoT network, there is there is a challenge to determining authorization of operations by a user with respect to each device in the IoT network. Thus, there is no guarantee that the session or an operation associated with the device is requested by a legitimate user or a function/program trusted by the IoT network, or another legitimate device within the IoT network.

DETAILED DESCRIPTION

Figure 1:
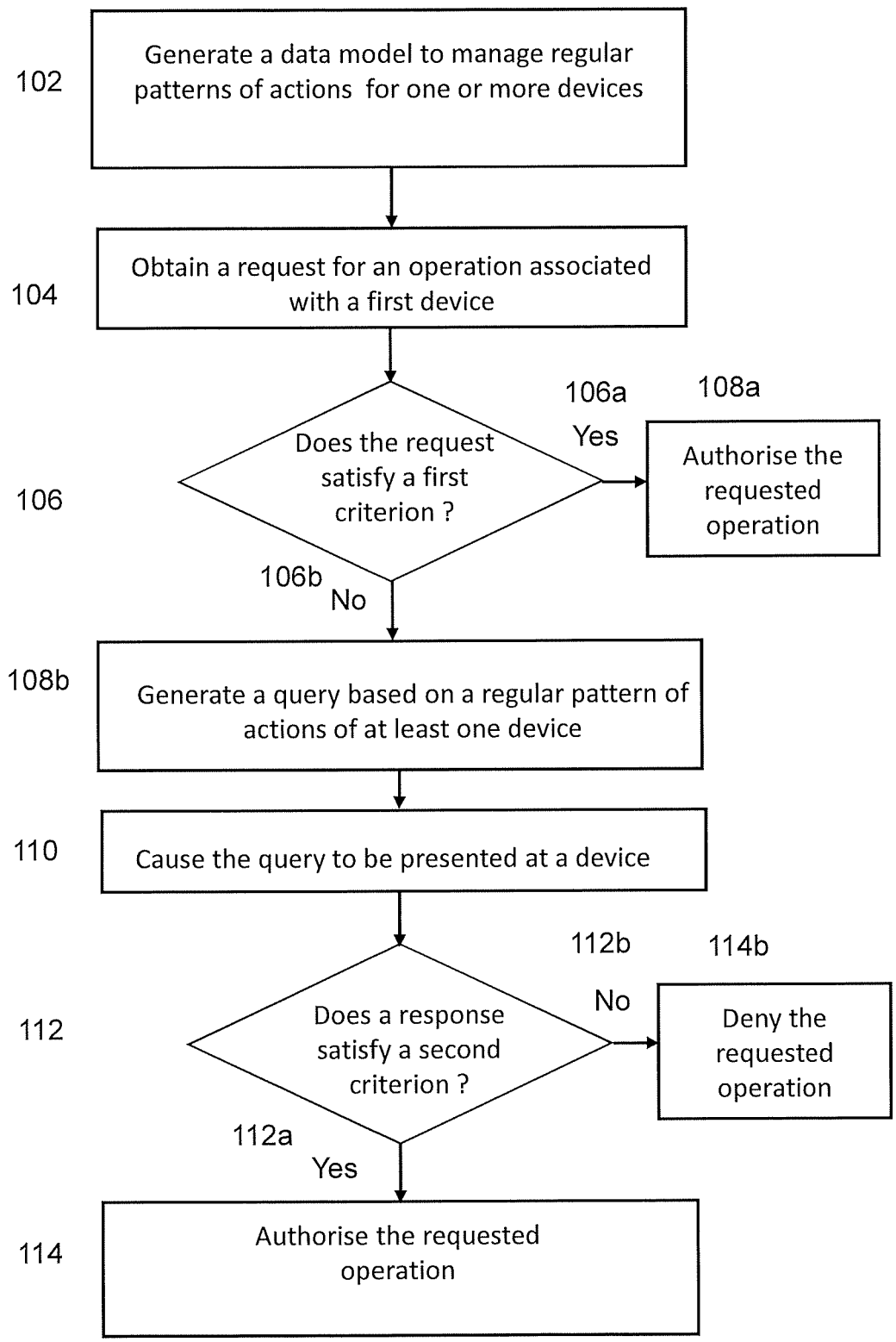
FIG. 1 is a flowchart illustrating a method of authorising an operation of a device in a user network, according to one embodiment.

In overview, aspects of the disclosure provide techniques, i.e. methods and/or associated devices and systems, for authorising at least one operation associated with a device, the device operating in a communication network. In some embodiments, the communication network may be a user network, for example a user's home network or an office network or a network in a location such as a café or hotel etc. The communication network is therefore referred to throughout the description as a user network, but it is to be understood that this such network is not to be considered as being limited to one associated to a particular user in any way and can be any communication network. In some examples, the user network that comprises a plurality of devices communicatively coupled to a computing device. This computing device may be a server device, such as a server computer. The sever computer may in some embodiments be a control device or a control server. Although the term control sever is used throughout the description, it is to be understood that the computing device is not considered as limited to a control server or a control system in any way and may be any computing device that is capable to being communicatively coupled with other devices in the user network.

A method for authorising at least one operation associated with a device in a user network is disclosed. The user network is, in some embodiments, an IoT user network that comprises a plurality of devices, i.e. IoT enabled devices or IoT devices, communicatively coupled to a control server and/or an IoT control/central hub.

The disclosed method includes generating a data model that is based on a plurality of patterns of actions for one or more devices among the plurality of devices. In some embodiments, each pattern of actions represents an order of one or more functions or operations associated with the device. In some embodiments, the actions in each pattern of actions are functions carried out such that the device reaches an operating state after each action. The data model in the disclosed method is configured to detect and/or store at least one regular pattern of actions for each device among the one or more devices, each action corresponding to an operating state of the device. In some embodiments, the data model may be a deep learning framework such as artificial neural network (ANN), i.e. a convolutional neural network (CNN). In related embodiments, the regular pattern of actions may be considered as knowledge relating to a particular device, in the data model.

The disclosed method includes receiving a request for an operation that is associated with a first device among the plurality of devices in the user network. It is then determined if the received request satisfies a first criterion, where the first criterion is based on or associated with the data model. The first criterion is for verifying authorization to perform the operation at one or more devices among the plurality of devices. In some embodiments the first condition is based on whether the received request is related to a function or an operating state present in a regular pattern of actions for the first device in the data model. Based on a determination that the first criterion is not satisfied, the disclosed method includes generating at least one query that is based on a regular pattern of actions of at least one device among the one or more devices in the data model. This query is generated to determine authorization to perform the operation at the one or more devices. In some embodiments, if the first criterion is satisfied, then the received request may be allowed such that the operation can proceed for the first device without generating any query.

In some embodiments, the query is generated based on one or more recent states of the one or more devices stored in the data model. In related embodiments, the query is dynamically generated using the request received and one or more regular pattern of actions associated with the first device, or any other device, or a combination of devices stored in the data model. In other related embodiments, the query is generated based on a static list of at least one prior regular pattern of actions associated with the first device or any other device, or a combination of devices stored in the data model.

Once the at least one query is generated, a computing device, such as the control system, may cause the at least one query to be presented in a graphical user interface. The graphical user interface includes one or more elements configured to receive input responsive to the query. Thus, in some embodiments, the at least one query is sent to the user interface. In some embodiments, the user interface that receives the query is associated with a first device or any other device, such as a second device, different to the first device that is configured to remotely control the first device. In some embodiments, the user interface may be associated with a trusted mobile device that is communicatively coupled to the control server and/or any of the plurality of devices in the user network. The disclosed method then includes determining if a response to the query received from the user interface satisfies a second criterion for satisfying the query. The second criterion is based on a comparison of the response received with the regular pattern (s) of actions on which the query is based. In other words, the second criterion is satisfied based on a comparison of the response to the at least one query to the regular pattern of actions associated with the query in the data model. The regular pattern(s) of actions on which the query is based is/are present in the data model for the comparison. Then, based on a determination that the second condition is satisfied following this comparison, the disclosed method includes authorising or allowing the received request for the operation associated with the first device. For instance, based on a determination that the second condition is satisfied, the disclosed methods include sending a message that causes the first device to permit performance of the operation at the first device, the message including an authorization to perform the operation and a setting for the first device to perform the operation based on the authorization. So, the authorisation includes providing the setting for the first device and/or control server based on the authorisation, so that the operation associated with the first device proceeds or is allowed based on the provided setting. In some embodiments, if the second criterion is not satisfied, then the received request is denied or disallowed such that the operation cannot proceed for the first device. In some embodiments, if the request for operation is denied, the requesting user, device, program or trusted user interface may be prompted by a signal or a message from the control server to enter one or more user network credentials or security details submitted upon registration or authentication of the first device for registration with the user network. In other embodiments, alert mechanisms may be triggered when the received request for operation is denied.

Advantageously, the disclosed techniques protect devices from illegitimate, or malicious use or operation. Specifically, the protection relies upon usage of one or more other devices in a communication network, thereby protecting operation in a granular matter with respect to operations based on usage patterns of other devices in the communication network. This may be protection from an unknown user or a function or program that is attempting to operate a device or access content or services provided by a device in the user network, thereby hijacking the devices. Such unauthorised operations, if allowed unchecked or unverified simply because the devices are pre-registered or authenticated to function in the user network, can potentially compromise the security of the entire user network. Such protection is provided by the disclosed method by allowing an operation requested on or for a device, only if the requested operation is verified based on regular patterns of actions for the device or other devices in the user network. This is ensured by managing a data model for patterns of actions for a given device. Managing a data model in some embodiments may including training and/or using the data model to learn and/or store one or more usual or regular patterns of actions for the given device. One or more patterns of actions, by one or more devices, may be used to more accurately determine authorization for any device with respect to an operation in a granular fashion. In some embodiments, any operations associated with learned and/or stored regular patterns may be detectable using the data model when further operations are requested for the given device. In some examples, patterns may not match the operation for which authorization is requested but may be verified by a user to determine authorization to perform a different operation, i.e. not associated with the pattern, on a different device. Such examples may rely of the user having knowledge of familiar or usual patterns, for instance. If a requested operation meets a first criterion, i.e. corresponding to a function or state associated with a regular pattern of actions for the device, then the operation is allowed. If the requested operation is a deviation from any regular pattern of actions for the device in the data model, then an authentication is performed to verify whether the operation is requested by a legitimate user or a function/program that is known to or registered with the user network. The authentication may be performed by generating a query (as disclosed herein). The query may be based on historic or previous activities, i.e. regular patterns of actions for a device in the data model. The disclosed method thus provides a real-time authorisation mechanism capable of detecting one or more irregular or new/unknown operations associated with devices in a user network and authorising such irregular or new operations only if can be verified that the request is made by a legitimate user or device or program. The disclosed method is particularly useful where devices in the user network are set up such that they can be accessed by one or more legitimate users securely. For example, IoT or smart devices in a household may be accessed by all members in the household, and each member may have one or more regular patterns of using each device in the household.

In some embodiments, the first criterion is based on a determination that one or more states of a regular pattern of actions stored for the first device in the data model is detected in the received request associated with the first device. For example, the first criterion may be an attribute or be associated with an attribute for making this determination. In related embodiments, a determination may be based on multiple attributes (e.g. criteria) for different attributes of the same device, i.e. the first device, or different devices. For example, a requested operation may be verified based on multiple patterns, i.e. use of two or more devices, one of which may be the device requesting the operation.

Advantageously, assessing if a first criterion is met, by checking the received request against previous activities or regular patterns of operation for the first device, i.e. the device for which the operation is requested, enables the data model to determine if the received request corresponds to a learned or stored regular pattern or not. If an irregular operation is detected, then the criterion is not satisfied.

In some embodiments the second criterion is a determination that one or more states of a regular pattern of actions stored for the first device and/or at least one other device among the one or more devices in the data model is detected in the received response.

The above described embodiments verify an operation requested for one device based on challenging the requesting user or program based on states or actions of a regular pattern of actions of the same or one or more other devices that were used or operated at a previous time in the user network. When the first criterion is not met, a query based on a regular pattern of actions of any device (not necessarily the first device) in the user network is generated. Advantageously, if an irregularity, i.e. an unusual pattern of actions not based on or related to a regular patter of actions in the data model, in a requested operation for a device is detected, then the query enables a user or a program requesting the operation to be challenged based on prior learned behaviour relating to any one of or a combination of devices in the user network. This is particularly advantageous in instances where the data model does not include enough knowledge regarding the first device to be able to form a regular pattern, for example when the device is new, or if a new but legitimate user or program is operating the device for the first time. Thus, advantageously the comparison carried out using the received response to the query to detect if a regular pattern of actions of one or more other devices in the data model is present in the response allows for a real time verification of legitimate use based on any device in the user network.

In some embodiments, authorising the received request in the disclosed method includes determining whether the received response is a complete match or a partial match to the regular pattern of actions associated with the query. Based on a determination of a complete match, the disclosed method includes generating a setting to allow the requested operation in an unlimited form, i.e. unrestricted access. The generated setting is then sent to the first device and/or control server. In some embodiments, an instruction or message may that include a setting, command or attribute that causes the operation to be performed in a certain form or manner.

In other embodiments, based on a determination of a partial match, the disclosed method includes generating a setting to partially allow the operation in the received request in a limited form, and sending the generated limited setting to the first device and/or control server. As mentioned above, some embodiments may include an instruction or message may that include a setting, command or attribute that causes the operation to be performed in a certain form or matter.

Advantageously, the above described embodiments allow customised authorisations to be provided for a requested operation based on whether the second condition to verify the legitimacy of the requesting user, function or application (program) has been fully satisfied or not. This enables different levels of access to be granted for a given device or resource based on the strength or extent of the verification outcome using the second criterion.

In some embodiments, generating a setting to partially allow the operation in the received request in a limited form comprises generating a data structure that is to be associated with the data model. This data structure may be generated within the data model or generated using one or more separate processing devices that are communicatively coupled to the data model. In some implementations, the data structure may be generated at the control server of the user network. In some embodiments, the data structure includes a hierarchy of predetermined tolerance levels, each level relating to a given regular pattern of actions of a given device among the plurality of devices in the user network. For each predetermined tolerance level, some embodiments include defining an access limit or a control limit for one or more states in the given regular pattern of actions of the given device. Then upon a determination of a partial match in the received response, a predetermined level of tolerance for the first device that corresponds to the partial match is identified. A function is then created to implement the access or control limit associated with the identified tolerance level and a setting is generated to implement the created function for the first device associated with the requested operation. For example, the data structure may be in the form of a hierarchical decision tree or pyramid, where a lowest level represents a least tolerance level. This may correspond to a 20% match with the received response, for instance. The lowest level is assigned assuming that any match less than 20% is to be disregarded in some implementations. In such case, the access or control limit is also set to be low, i.e. 20% to correspond to the level of the partial match, thereby only allowing very limited access for the requested operation. A highest level of the data structure may then represent the highest tolerance level which may correspond to a 90% match, assuming that any match over 90% in the received response is deemed to be a complete match. In this case, the access or control limit is set to be high, such as 90%, thereby allowing an almost full access to the requested operation.

Advantageously, the above described embodiments enable implementing different access or control limits for operating a device pertaining to the received request. This is enabled by generating a data structure, such as decision tree, with predetermined threshold levels for each access or control limit. This enables accurate customised authorisations to be granted based on the extent of verification of the received response.

In some embodiments, the request for an operation associated with the first device may include one or more of the following functions:
  i) receiving a signal from an interface that is associated with the first device
  ii) receiving a signal from an interface associated with another device among the plurality of devices in the user network
  iii) receiving a signal from an interface associated with a mobile computing device that is capable of communication with the control server and/or one or more of the plurality of devices in the user network iv) receiving a signal from an application or a program running on a mobile computing device.

In related embodiments, the step of receiving a request for an operation may include receiving the request at the control server; or receiving the request at a processor associated with the first device.

Advantageously, the above described embodiments enable the request for operation to be sent from any interface, computing device or application associated with the first device. Similarly, the request for operation may be received at either the control servers, or another computing device or application associated with the first device. Thus, the disclosed method provides for remotely accessing and controlling the requests for operation sent and received for the first device, for example from a mobile terminal that may not be connected to or associated with user network.

In some embodiments, the user interface for receiving the query is a user interface associated with a first device or another device that is configured to remotely control the first device. In other embodiments, the user interface may be a user interface of a trusted mobile device associated with a user identifier, such as mobile phone number, that is registered for the user network. In some embodiments, the user interface of the trusted mobile device is configured for providing or displaying data relating to current operating states of the plurality of devices in the user network. For example, in some embodiments the user interface may be configured for managing and controlling devices, in particular different criteria for authentication, viewing device states, requests for the devices, authentication status for the devices, changing authentication or manual override etc. for the devices.

The above described embodiments enable receiving the query at the first device or a trusted mobile device. If a trusted mobile device is used, then an identifier of the trusted mobile device is linked to a user profile or phone number of at least one user registered with the user network. The trusted mobile device may be associated with an application for monitoring all devices in the user network. Sending the query and receiving a response to the query from a trusted mobile device is advantageous in situations where the first device may not have a user interface for handing reception and transmission of a request or query/response. Furthermore, security is increased by using a trusted mobile device other than the first device for verifying the first device.

In some embodiments, the disclosed method also relates to a computer implemented method of generating a data model for detecting a regular pattern of actions for one or more devices in a user network. The data model may be implemented using a processor that is associated with a memory for obtaining and/or storing data related to the one or more devices. In some embodiments, the data model is an artificial neural network (ANN) that receives and analyses actions or operations as inputs associated with a device in the user network.

One embodiment of generating the data model includes obtaining as a first input, training data including a plurality of patterns of actions for one or more devices. A second input is then obtained with training data for each device among the one or more devices. The second input represents at least one regular pattern of actions for the given device. The training data in the second input including rules for indicating at least one of a start time, an end time, a duration, one or more states or data items accessed by a given device, etc. In some examples, the training data in the second input be defined in relation to one or more other device among the one or more devices, where multiple devices may be used together for a pattern of actions. Furthermore, an output of the data model is obtained, where the output comprises an indication of the presence or absence of at least one regular pattern of actions corresponding to the given device in the first input. Once the output is obtained, one or more functions are applied for reducing an error between the output of the data model and the patterns of actions for the given device in the first input in the data model.

Advantageously, the data model based on the above described embodiment is trained to learn, store and/or detect regular patterns of actions for one of more devices in the user network based on a supervised learning model, whereby one or more rules for defining a regular pattern of actions for a given device is provided to the model.

An alternative embodiment of generating the data model includes obtaining as a first input, a pattern of actions for each given device among the one or more devices. Responsive to a predefined amount or combination of similar patterns of actions obtained for the given device, at least one regular pattern of actions for the given device is defined based on the predefined amount or combination of similar patterns of actions. In some embodiments the predetermined amount or combination may be a predetermined number of similar patterns. Although a predetermined number is referred to herein for this embodiment, it is to be understood that the embodiment is not limited to a number or patterns and may also, for instance relates to certain types or combination of patterns from one or more devices. A second input is then provided which includes the at least one regular pattern of actions for the given device. The second input includes rules indicating at least one of a start time, an end time, a duration, one or more states or data items accessed by the given device in the at least one regular pattern of actions. An output of the data model is then obtained, the output being an indication of the presence or absence of the at least one regular pattern of actions corresponding to the given device in the first input. Once the output is obtained, one or more functions are applied for reducing an error between the output of the data model and the patterns of actions for the given device in the first input.

Advantageously, the data model based on the above described alternative embodiment is trained to learn, store and/or detect regular patterns of actions for one of more devices in the user network based on an unsupervised learning module, whereby once a predefined number of similar patterns of actions for a device is received, a regular pattern of actions is leaned or stored for the device.

In some implementations, the data model is an artificial neural network (ANN). In both the above described embodiments, the data model includes adjusting connection weights of neurons within the data model to minimise the error or difference between the output and the first input of patterns of actions. The output of the data model may be a flag or setting or metadata that indicates the presence or absence a stored or learned regular patterns of actions. In some embodiments, this may be in binary output form, i.e. a flag or setting where "1" or similar indicates the presence and a "0" or similar indicates the absence of a regular pattern of actions.

Advantageously, the data model is generated for dynamically detecting a regular pattern of actions when a given device is operated in the user network. The detection is based on data gathered with implicit or explicit permission provided to the data model, so that the data model can be trained using supervised or unsupervised learning models.

The training data is considered as knowledge of behaviour and use of devices in the user network, that can furthermore be used to authorise subsequent requests for operation by detecting and/or differentiating regular and irregular patterns of actions in the request for operation. In some embodiments, the regular patterns of actions in the data model are associated with a single user or multiple users that is/are registered for the user network.

Advantageously, the data model is therefore able to associate different regular patterns of actions with separate legitimate users that are registered for the user network, thereby applying regular patterns that are only associated with a given user or user profile for detecting regular patterns in a requested operation by the given user or user profile.

In some embodiments a data model of the disclosed method is implemented using at least one processor associated with a memory. The data model may be configured using programming instructions for implementing the above described embodiments for detecting a regular pattern of actions in one or more devices in the user network.

In some embodiments the disclosed method may be implemented in or for an IoT user network that includes a plurality of IoT devices and a control server or IoT hub, where the control server is a computing device communicatively coupled to the plurality of IoT devices. The computing device, although referred herein as a control server for ease of reference and understanding, in implementation may be a server computer or a cloud computing device or even a local network device, such as a network node with one or more processors associated with it. Thus, the control system mentioned in present disclosure and embodiments are not to be construed as being limited to a server device alone. The IoT devices may be previously configured to/authenticated for operating in the IoT user network. The control server may be communicatively coupled to a trusted mobile device that includes a user interface for providing or displaying data relating to a current operating state of one or more of the plurality of IoT devices. The control server in some embodiments is connected to the plurality of devices via an IoT gateway or a router that each of the IoT devices are connected to for establishing a connection with the control server. In some embodiments the IoT gateway and/or the control server may be implemented in one or more computing devices with standard or customised hardware architecture. In other embodiments the IoT gateway and/or control server may be hosted remotely in a cloud environment or at a remote server.

In some embodiments, the control server includes one or more processors that are associated with a memory, the control server being further associated with a data model, such as set out above, for detecting a regular pattern of actions for one or more of the plurality of IoT devices. The one of the more processors of the control server may be configured using programming instructions to implement the disclosed method explained above.

In some embodiments, the IoT devices in the IoT network may be configured with minimal firmware that enables the IoT hub or control server to manage authentication of the IoT devices and authorisation of requested operations for the IoT devices.

Some specific components and embodiments of the disclosed method are now described by way of illustration with reference to the accompanying drawings, in which like reference numerals refer to like features.

FIG. 1 is a flowchart depicting a method for authorising at least one operation associated with a device operating in a user network that comprises a plurality of devices communicatively coupled to a control server.

In step 102 a data model is generated. The data model may be an ANN, as mentioned above, and may be generated based on a plurality of patterns of actions for one or more devices among the plurality of devices in the user network. The data model is configured to detect and/or store at least one regular pattern of actions for each device among the one or more devices. Each action corresponds to an operating state of a given device. This configuration may be provided by training the data model using supervised or unsupervised learning mechanisms, as described earlier.

For example, let us consider a scenario where the first device is an IoT enabled (smart) television. The functions of turning on the television at 10 pm each weeknight to watch BBC news by a user for 30 minutes, before switching off the television and then turning the television on again at 6 am the next weekday to watch a fitness channel for 30 minutes before turning the television off for the day, may be learned and/or stored as an example regular pattern of actions for the television associated with the user in a home network. A first action for the above example regular pattern of actions in the data model is switching on the television at 10 pm, while the first state is that the television is turned on at 10 pm. A second action is tuning the television to BBC news and a second state is that the television is tuned to BBC news for a duration of 30 minutes. A third action is switching off the television at 10:30 pm and a third state is that the television remains switched off from 10:30 pm to 6 am the next weekday. A fourth action is that the television is turned on at 6 am the next weekday, while the fourth state is that the television is turned on at 6 am. A fifth action is tuning the television to the fitness channel and a fifth state is that the television is tuned to the fitness channel for a duration of 30 minutes. A sixth and final action in the example pattern is switching off the television at 6:30 am, corresponding to a sixth state of the television being switched off for the weekday. All the above actions and states represent the example regular pattern of actions for the television in the data model.

In some implementations, user profiles for each user registered to legitimately access the user network may be stored at the data model or provided to the data model from a control server of the user network. In some embodiments, at least one regular pattern of actions in the data model is associated with at least one registered user profile.

In step 104 a request for an operation associated with a first device among the plurality of devices is received. This request may be received from the first device by a user operating the first device or requested by an application on another device on behalf of the first device.

In step 106, it is determined if the received request satisfies a first criterion. The first criterion being based on or associated with the data model. Based on a determination that the first criterion is satisfied in step 106*a*, the requested is authorised in step 108*a* and the operation can proceed.

Referring to the above described example regular pattern of actions, if for instance the television is switched on at 10 pm but turned to a music channel instead of BBC news, or if the television is switched off in the middle of the news and then switched on again at 11 pm to a movie channel, these irregular actions will be determined to be an irregularity that does not match an action or state in the example regular pattern of actions. In this case the first condition will not be satisfied. If, on the other hand the television is turned on at 10 pm and tuned to the news, then the first condition is satisfied, and the user can continue to watch the news with no interruption from the data model.

Based on a determination that the first criterion is not satisfied in step 106b, then in step 108b at least one query is generated. The generated query is based on a regular pattern of actions of at least one device among the one or more devices. This regular pattern of actions is based on patterns of actions previously learned and stored in the data model that can relate to any device in the user network, not necessarily the first device.

In some embodiments, on learning new regular patterns of actions based on a continued use of a device within the IoT network, the data model is configured to dynamically review if a requested operation at a device is to be challenged by generating a query prior to providing authorisation. For instance, if a certain irregular pattern is repeated by the user or another legitimate user a predefined number of times for a device, then the data model is configured to learn this irregular pattern as a new regular pattern of actions and add it to existing knowledge in the data model for a given user and a given device.

Referring to the above described example pattern again, if the first criterion is not satisfied because the television was turned on at 11 pm on a Tuesday night to watch a movie, the generated query may include a challenge relating to a different regular pattern of actions for the television. This challenge may be based on another regular pattern of actions stored in the data model for the television during weekends, where the user watches an episode of the television series "Game of Thrones" every Sunday night at 9 pm on Sky Atlantic channel. In this query the challenge may be to ask the user to select the name or thumbnail of the episode watched on the previous Sunday evening from among some options of episode names or thumbnails from the same or different television series. Alternatively, or even additionally, the query may also challenge the user based on a regular pattern of actions for a different device. For example, the challenge may be to ask the user to confirm weekday timer settings for a smart air conditioning or heating unit or to confirm a most recent change made to light timers, or to confirm the name of a radio station or radio breakfast show that is played every morning from 7 am in a kitchen radio in the user's home network.

Figure 8:
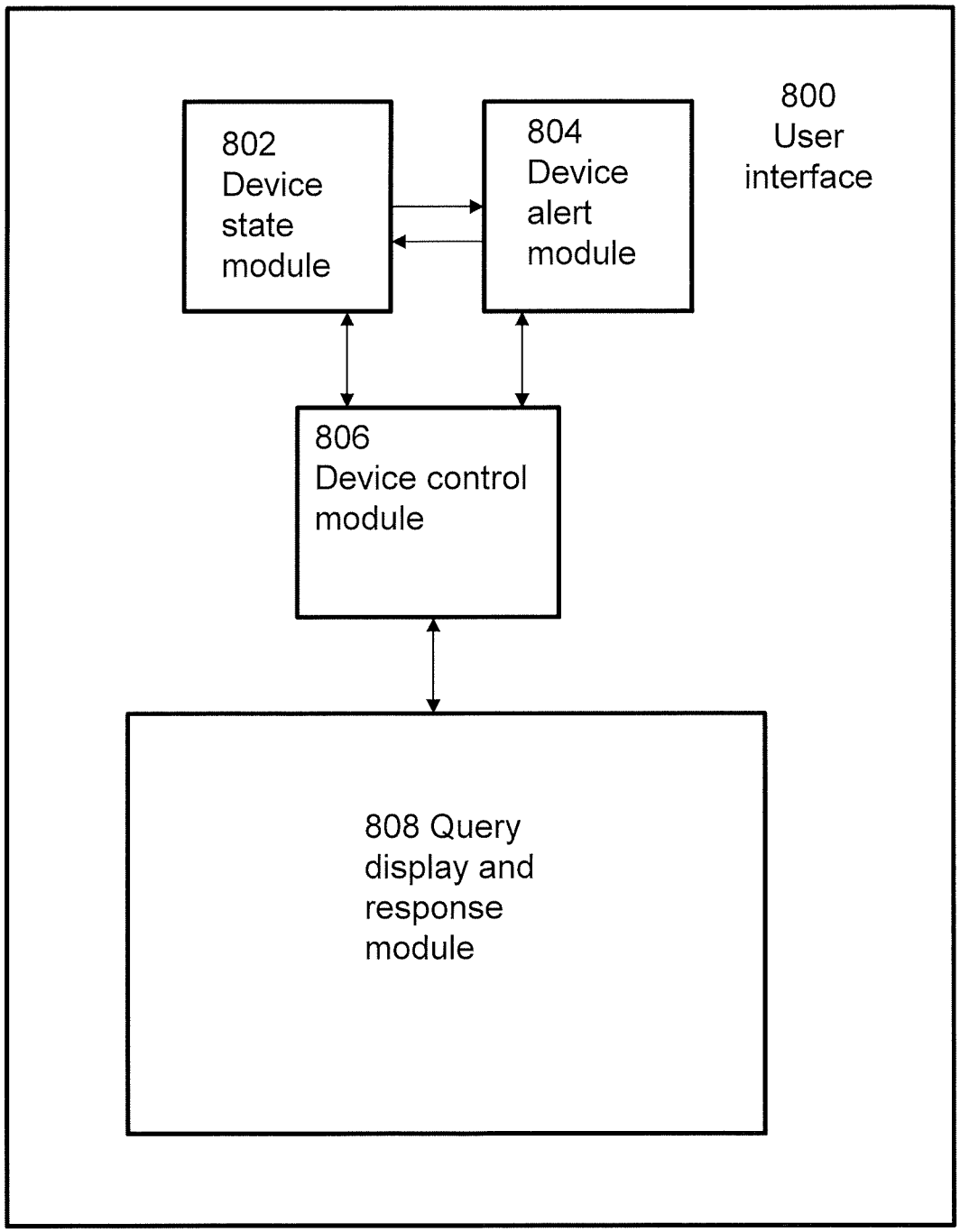
FIG. 8 is an example of a user interface.

In step 110, the at least one query is sent to a user interface. This user interface may be on a trusted mobile device, such as the user's smart phone. Alternatively, this interface may be associated with the first device or any other device that can control the first device requesting the operation. The user interface is shown in FIG. 8 and explained below in more detail.

In step 112, it is determined if a response to the at least one query received from the user interface satisfies a second criterion. The second criterion is one that is based on a comparison of the received response with the same regular pattern of actions in the data model that is associated with the query (in step 108b).

Based on a determination that the second condition is not satisfied in step 112b, then in step 114b the request associated with the first device is denied, and the requested operation is not allowed to proceed. It is also possible for a notification to be generated and sent to one or more devices or a trusted mobile device if the operation is denied.

Based on a determination that the second condition is satisfied in step 112a, then in step 114a, the received request for the operation is authorised. This authorisation can include providing a setting for the first device and/or control server based on the authorisation. For example, the setting may be a flag that is set to allow the requested operation. In other examples, the setting may be one or more parameters to inform or notify the control server and the first device that the operation can proceed.

Referring to the above described example again, if the response to the received query is that BBC Radio 1 is turned on at 7 am, and if this matches the action and state stored the data model for the regular pattern of actions referred in the query (based on the kitchen radio), then second condition is satisfied. If, however, the response from the user includes Capital FM, which does not match any regular pattern of actions for the kitchen radio, then the operation that is requested by the user (to watch a movie at 11 pm on Tuesday night) is denied and the user will not be allowed to watch the movie. The user may then receive a message on the television screen requesting user name/password or other details that were provided on authentication or registration with the user network, before allowing further access to the television. In another example, if the response received mentions BBC Radio 2 instead of BBC Radio 1, which although not an exact match may still be allowed 50% access in embodiments where the data model includes a hierarchal data structure as explained above. For instance, the user may be allowed to watch the movie for a 15-minute period before another query is provided or further details are requested. Thereby providing a reduced amount of access to the requested movie.

In another example scenario, consider a low power or low complexity device such as an electronic lock or a type of securing mechanism for access to a secure or private space, such as an office or a study in a user's home. A regular pattern of actions for the lock in the data model according to some embodiments may for example indicate that access to the secure space via the lock is only requested between 7 am to 7 pm on Tuesdays every week and occasionally between the hours of 9 pm and 11 pm on other weekdays. For instance, this may correspond to the dates and times where the user may be working from home. Access may be provided either by the (authorised) user operating the lock with or without a key code, fob or similar; or by enabling a trigger, such as a piezoelectric transducer that can be controlled by an electrical signal such that it becomes unlocked automatically with no user input required at the above-mentioned times and remain locked at all other times. If access is requested to the space at any other times not falling within the times indicated in the regular patter of actions for accessing the secure space, then a query, either in relation to the lock or in relation to another device such as the television or kitchen radio as discussed in the scenario above, is sent to the user. The query may be provided on the user's mobile phone or may be displayed on a screen available near or for the lock. Based on the response received at the screen or an interface on the user's mobile phone, similar to the scenario explained above, the lock can allow or deny access to the secure space.

Figure 2:
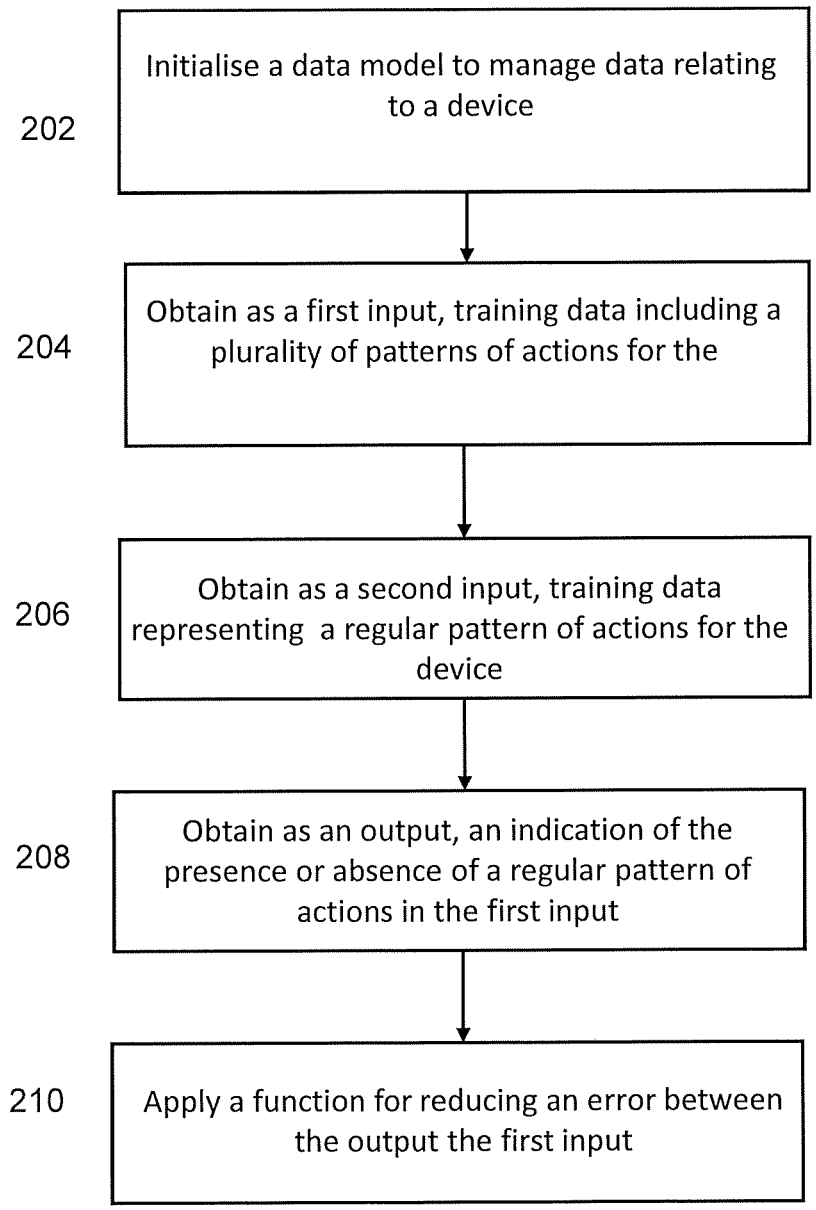
FIG. 2 is a flowchart illustrating a method of generating a data model for detecting a regular pattern of actions for a device in the user network, according to one embodiment.

FIG. 2 is a flowchart showing a computer implemented method of generating a data model, based on supervised learning, for detecting a regular pattern of actions for one or more devices in a user network. The data model may be an artificial neural network (ANN).

In step 202, the data model is initialised in a memory associated with a processor for managing data associated with the one or more devices. In some embodiments, managing the data includes obtaining and/or storing data associated with the one or more devices. In some embodiments, permissions for gathering and storing data associated with the actions of the one or more devices are obtained implicitly or explicitly by the data model upon registration or authentication of each device for operation in the user network. In some embodiments, the data model may be configured to learn and/or store up to a certain number of recent functions or states for the one or more devices, and/or to discard or forget older functions or states once this certain number is reached for a given device.

In step 204, a first input is obtained comprising training data including a plurality of patterns of actions for the one or more devices. As mentioned above, the actions may include functions or operation on a given device, each representing an operating state of the device.

In step 206, a second input is obtained comprising training data for each device among the one or more devices. The training data includes rules for indicating at least one of a start time, an end time, a duration, one or more states or data items accessed by a given device. These rules represent properties or parameters of states and/or actions that constitute a regular pattern of action. Each second input represents at least one regular pattern of actions for the given device.

In step 208, an output of the data model is obtained or provided, the output indicating of the presence or absence of at least one regular pattern of actions corresponding to the given device in the first input.

In step 210, one or more functions are applied for reducing an error between the output of the data model and the patterns of actions for the given device in the first input. This is so that the data model is trained so that it learns and builds accurate knowledge to enable detection of one or more regular patterns of actions for each of the one of more devices, when the data model is presented with a new input or subsequent inputs including one or more states and/or actions that relate to a learned regular pattern or actions.

In some implementations, a classification and or clustering algorithm may also be employed to train the data model for identifying the actions received. ANNs, otherwise known as connectionist systems, are computing systems vaguely inspired by biological neural networks. It is known that such networks "learn" tasks by considering data samples, sometimes without task-specific pre-programming and without any prior knowledge about a task, and instead, evolve their own set of relevant characteristics from learning material or samples that they process. ANNs can be hardware-based (where neurons are represented by physical components) or software-based (computer models) and can use a variety of topologies, learning algorithms or functions.

Figure 3:
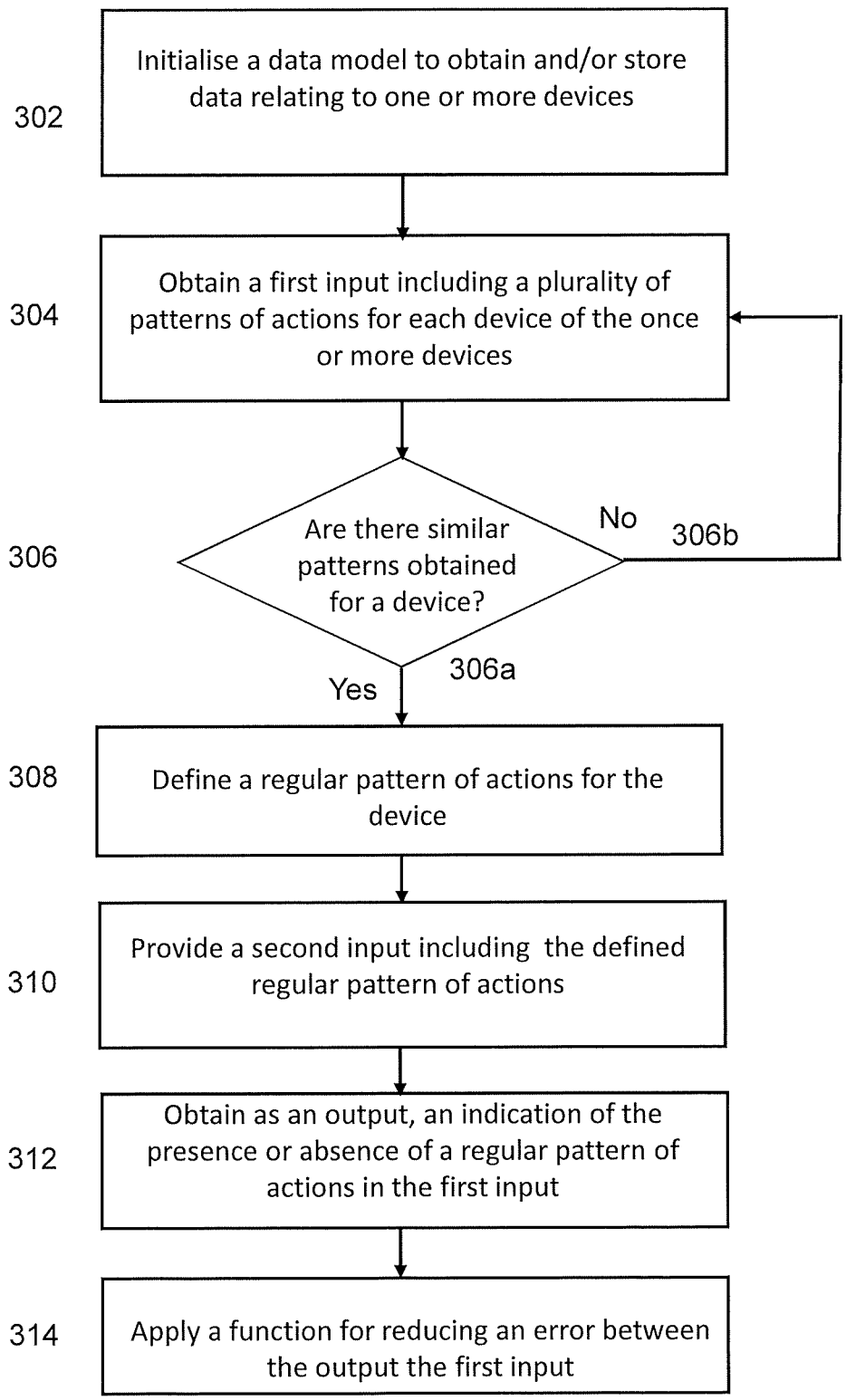
FIG. 3 is a flowchart illustrating an embodiment of generating a data model for detecting a regular pattern of actions for a device in the user network, according to one embodiment.

FIG. 3 is a flowchart showing a computer implemented method of generating a data model, based on unsupervised learning, for detecting a regular pattern of actions for one or more devices in a user network. The data model may be an ANN and the operation of the ANN according to FIG. 3 may be mostly like the ANN of FIG. 2, except that the methodology of training the data model is different, as given below.

In step 302, the data model is initialised in a memory associated with a processor for obtaining and/or storing data associated with one or more devices in the user network.

In step 304 a first input is obtained. The first input includes a pattern of actions for each device among the one or more devices.

In step 306, it is determined if a predefined number of similar patterns of actions has been obtained for a given device at the data model.

Based on a determination that the predefined number is not yet reached in step 306b, then step 304 is repeated to obtain more first inputs.

Based on a determination that the predefined number is reached in step 306a, in step 308 at least one regular pattern of actions is defined for the given device based on the predefined number of similar patterns of actions. Similarly, regular patterns of actions may be defined for any of the one or more devices for which a predefined number of similar patterns of actions is reached for each respective device, as set out in step 306 relating to the given device.

In step 310, a second input is provided including the at least one regular pattern of actions for the given device. The second input includes rules for indicating at least one of a start time, an end time, a duration, one or more states or data items accessed by the given device in the at least one regular pattern of actions. These rules represent properties or parameters of states and/or actions that is constituted in each regular pattern of actions that is defined in step 308. Each second input represents a regular pattern of actions for the given device. Step 310 may be repeated for each of the devices for which the predefined number of similar patterns of actions has been reached, In step 312, an output of the data model is obtained or provided. The output is an indication of the presence or absence of the at least one regular pattern of actions corresponding to a device (the given device, as set out in FIG. 3) in the first input.

In step 314 one or more functions are applied for reducing an error between the output of the data model and the patterns of actions for the given device in the first input. This ensures that the data model is trained so that it learns and builds accurate knowledge to enable detection of one or more regular patterns of actions for at each of the one of more devices, when the data model is presented with a new input or subsequent inputs including one or more states and/or actions that relate to a learned regular pattern or actions.

Figure 4:
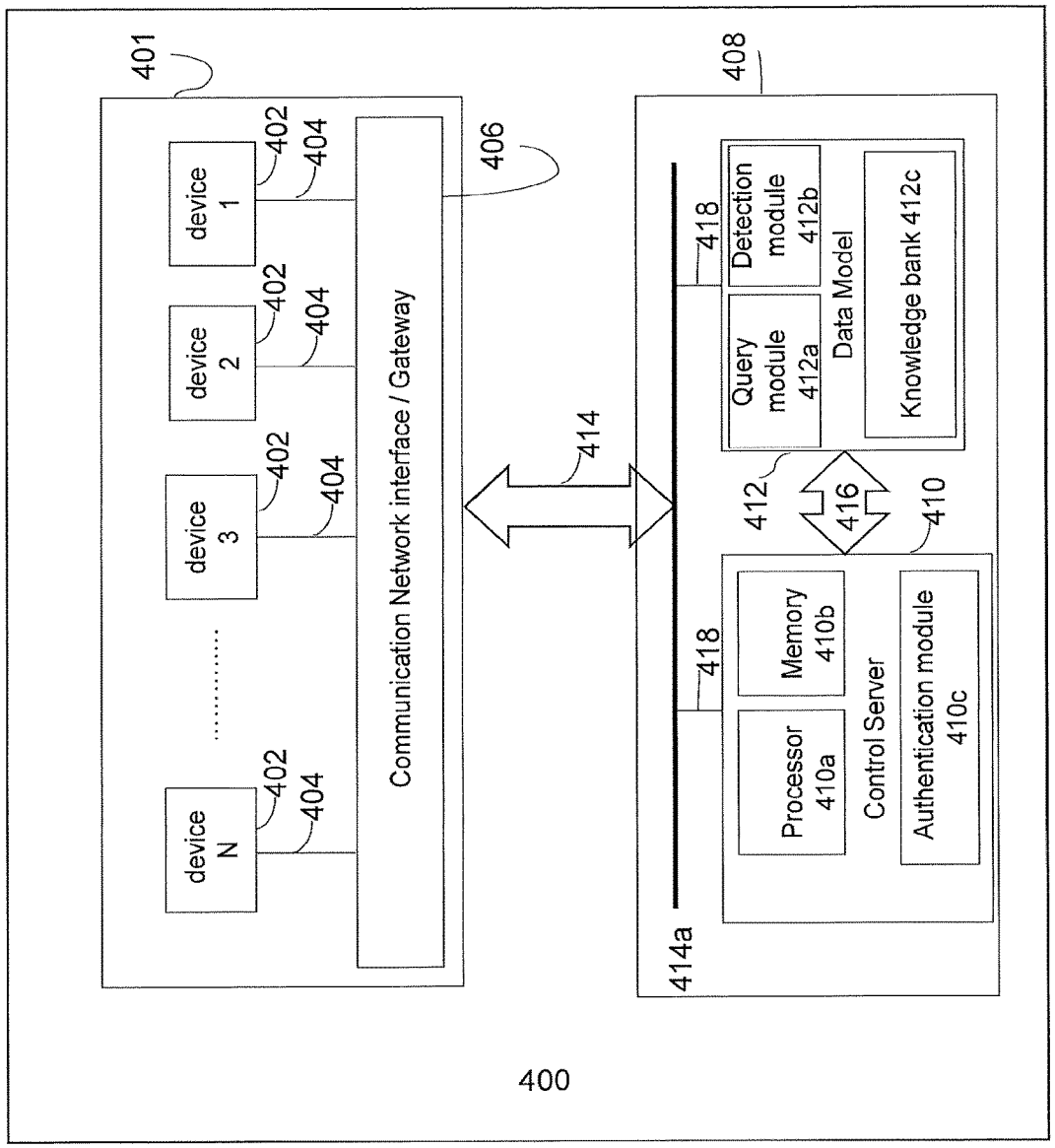
FIG. 4 is an illustration of a communication network that employs methods according to some embodiments.

FIG. 4 depicts a communication network for which the disclosed method and associated embodiments may be applied. The communication network shown is a user network, such as an IoT network 400 with a plurality of IoT devices 402 (see devices 1 to N) that are communicatively coupled using an IoT gateway 406. The IoT gateway 406 may be a network interface such as a router. The IoT gateway 406 is connected to an IoT server environment or IoT hub 408. The IoT devices 402 may also be connected to each other.

Each of the 1 to N IoT devices 402 are connected (wired or wirelessly) to the IoT gateway 406 using respective connection links 404. In some examples the IoT devices 402 may be IoT enabled devices, such as smart devices in a user's private home IoT network 400. The IoT devices 402 and the IoT gateway 406 represent a client environment 401 in the IoT network 400.

Figure 6:
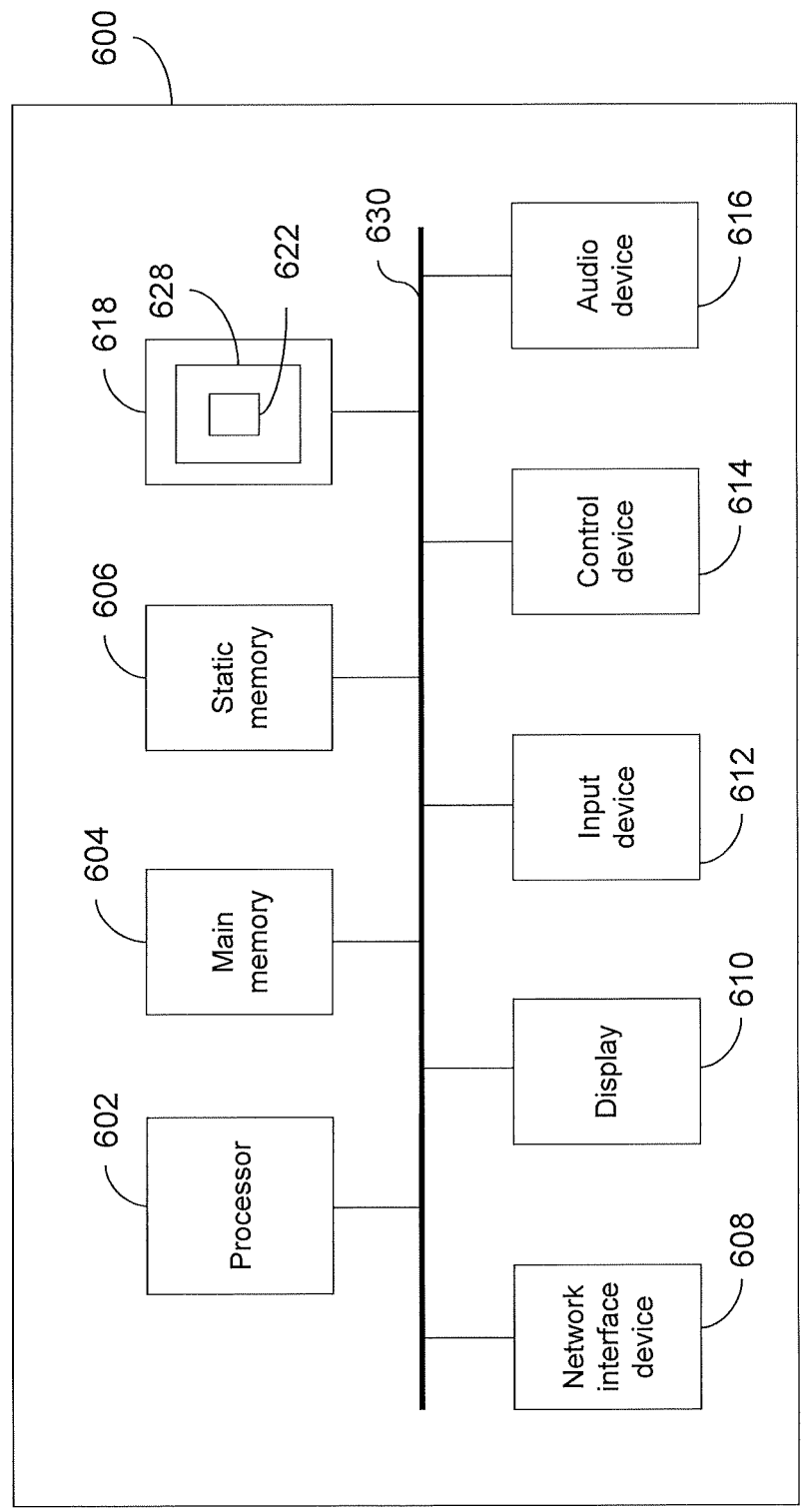
FIG. 6 is an illustration of an example computing device suitable for implementing methods according to some embodiments.

The IoT gateway 406 connects the IoT devices 402 using a further communication interface 414 to the server environment 408 of the IoT network 400. The server environment 408 includes a control server 410 that is associated with a data model 412. The control server 410 is shown as separate to the data model 412 in FIG. 4, but both can be associated in one device or system. The server environment 408 may be implemented using a specific hardware implementation such as shown in FIG. 6 (explained below) or may be implemented on a cloud server or using cloud environment that can be remotely accessed using the communication interface 414 by the client environment 401. The control server 410 and the data model 412 are communicatively connected to each other using a further interface or bus 414a, and respective connection links 418.

The control server 410 includes a processor 410a, a memory 410b and authentication module 410c. The authentication module 410c although shown separately, may be incorporated within the processor 410a. The authentication module 410c is provided for authentication of and/or registration of the IoT devices 402 and users of the IoT network 400. User profiles and device profiles that are registered for the IoT network are stored at the control server 410.

The data model 412 includes a query module 412a, a detection module 412b and a knowledge bank 412c. The data model 412 is a learning engine such as an ANN that may be implemented using one or more computing devices or processors. The knowledge bank 412c is a database or storage module provided for storing regular patterns of actions of the IoT devices 402 in the IoT network 400. The detection module 412c is configured for detecting if one or more regular patterns of actions are present or absent in a request for operation received from any of the IoT devices 402 in the client environment 401. The query module 412a is configured to generate a query based on at least one regular pattern of actions in the knowledge bank 412c, if no regular pattern is detected in the request for operation.

Figure 5:
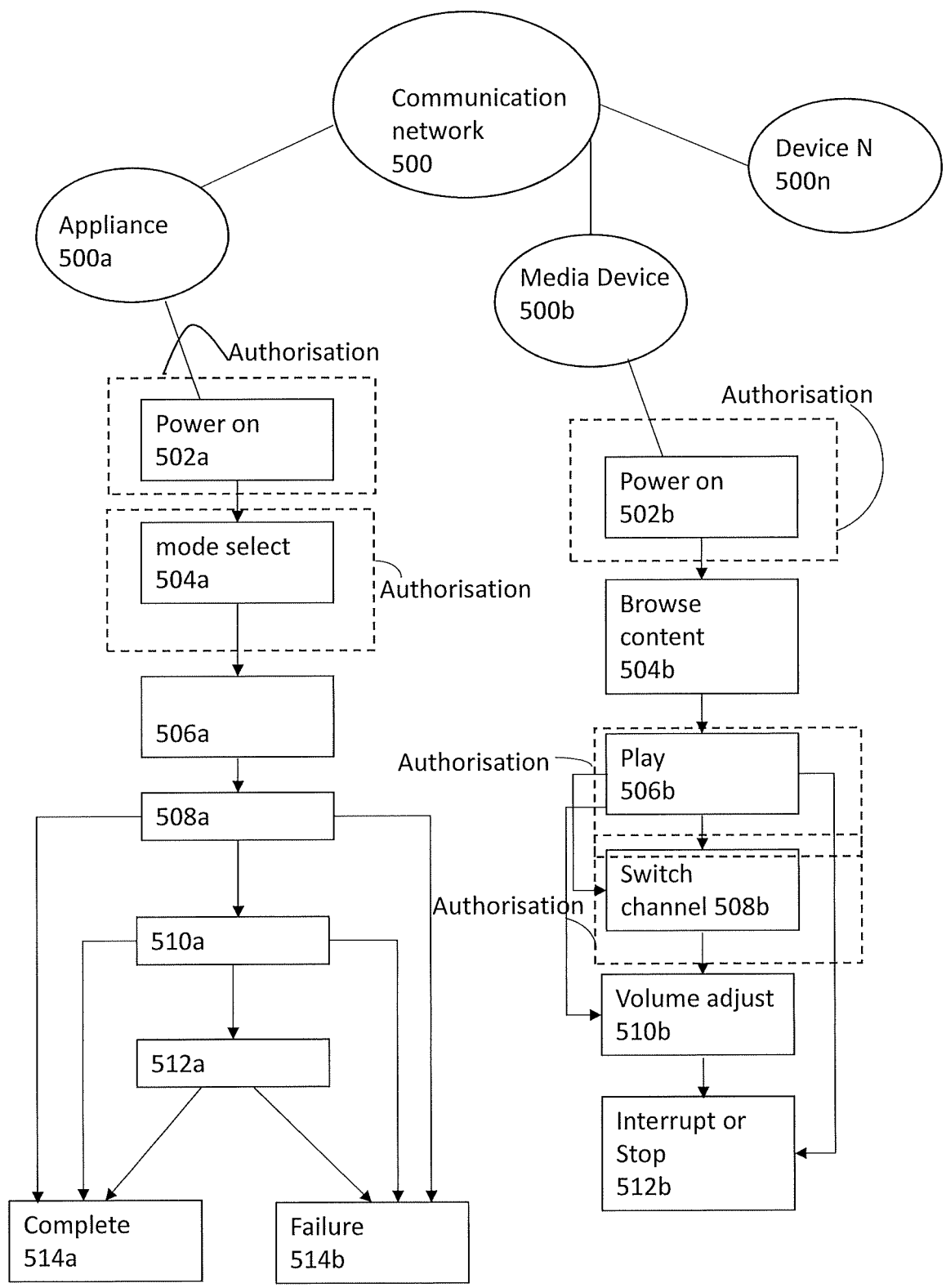
FIG. 5 is an illustration of some example scenarios for operating one or more devices in a communication network employing methods according to some embodiments.

FIG. 5 depicts example scenarios when the disclosed method is implemented for a communication network, such as a user's home IoT network 500 that includes 1 to N devices, where one device is an appliance, such as a smart washing machine 500a, and another device is a media device, such as a smart Set Top Box (STB) 500b for IP TV. Although the below scenarios relate specifically to the washing machine and the set top box, it is understood that these scenarios apply equally to other similar kinds of appliances or media devices.

One scenario relates to the operation of the smart washing machine 500a. Events representing states or actions start, washing state, load, maximum rpm spin state, 30-degree drying state, or failure etc. may be reported to a data model associated with the home network 500 so that a regular pattern of actions may be learned and stored from these events. These events are indicated in FIG. 5. For example, upon power-on in step 502a there may be a background process to check that the washing machine 500a is registered or authenticated with the home network 500. If a drying mode is then selected in step 504a, then depending on whether or not this action and/or state is included in a regular pattern of actions for the washing machine, authorisation may be requested before the action of drying can proceed. This authorisation will be in the form of a query relating to the washing machine 500a or another device in the home network 500, like the set top box 500b. Upon successful authorisation, the action to load the washing machine 500a in step 506a is permitted. The operational states of refilling water 508a, washing 510a and drying 512a can then proceed according to a chosen mode. Whether or not the washing/drying cycle was successfully completed or not is recorded as a failed state 514a or completed state 516a. Steps 502a, 504a, 506a along with the outcome of 514a or 516a may then be learned as a pattern of actions for the washing machine 500a. The states that influence whether or not a complete or failure state is reached is shown in FIG. 5. Another scenario relates to the operation of an STB 500b that can report playback events such as which movie was watched, channel change events, volume increase events etc. to the data model in the home network 500, which can in turn gain knowledge in the form of regular patterns of actions representing user behaviour like a regular switch on times and interests in movies watched recently. These events are indicated in FIG. 5. After gaining this knowledge, on irregular switch on events or when access to restricted or unusual content/channel is requested, the data model and/or control server (which may be managed by an OTT television service provide) is configured to provide random thumbnails of recently watched content and generate a query to challenge the user to click on the thumbnail of a movie that was ordered or watched the previous day. This is to ensure that the subscriber (user) is legitimate, before allowing further access to the STB or the content requested. For example, upon power-on in step 502b there may be a background process to check that the STB 500b is registered or authenticated with the home network 500. Following a browse content state in step 504b, if a new or unusual content item not been viewed before or does not correspond to content usually viewed (so does not correspond to a regular pattern of actions) is selected for playback in step 506b, then authorisation may be requested with a query based on the STB 500b or another device connected to the home network 500, before the content item can be played in step 506b. If authorisation fails, then an interrupt state 512b is reached. If authorisation is successful than the content item is provided for playback. Similarly, authorisation based on a different query may be requested by the data model if a channel switch state is detected in step 508a or if volume is adjusted in step 510b, if such changes and/or adjustments are not consistent with a regular pattern of actions for the STB 500b.

FIG. 6 illustrates a block diagram of one example implementation of a computing device 600 within which a set of instructions, for causing the computing device to perform any one or more of the methodologies discussed herein, may be executed. The computing device 600 may operate in the capacity of the control server, data model or any other device in the user network described above. In alternative implementations, the computing device 600 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein. The computing device 600 may be configured to operate as any one of the IoT devices in the user network, including the control server or the trusted mobile device.

The example computing device 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard or touchscreen), a cursor control device 614 (e.g., a mouse or touchscreen), and an audio device 616 (e.g., a speaker).

The data storage device 618 may include one or more machine-readable storage media (or more specifically one or more non-transitory computer-readable storage media) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media. The data storage device is additionally configured for storing hierarchical data structures, such as the product trees and relative remainder trees that are required for the computation of the intermediate and final output.

Figure 7:
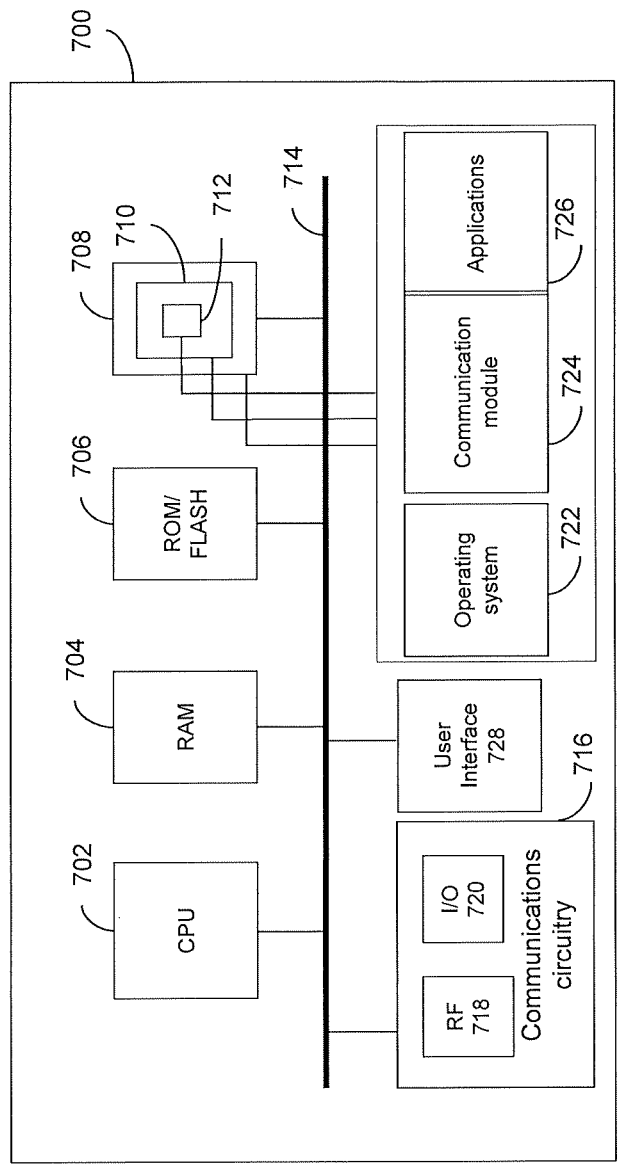
FIG. 7 is an example of a specific hardware implementation of a computing device or a system for authorising an operation of a device in a communication network.

With reference to FIG. 7, a specific hardware implementation 700 of a computing system is shown, which may the control server, the trusted mobile device, the data model and/or any one of the devices in the user network. The system comprises a CPU 702, RAM 704, ROM or FLASH memory 706 (or any other suitable memory arrangement), a user interface 728 which may include a graphical user interface (GUI) and a plurality of (two or more) sub-processors or processing circuitry 708, 710, 712, communicating over a bus 714 or communication circuitry 716 which can also be or include a communication interface. The communications circuitry 716 can include RF circuitry 718 and/or 1/O ports 720 for sending and receiving information. The RF circuitry 718 permits transmission of information over a wireless link or network to one or more other devices and includes well-known circuitry for performing this function. The port 720 permits transmission of information over a wired link. The communications circuitry 716 can communicate, with one or more other computing devices or peripheral devices.

The system hardware implementation 700 may be configured as separate isolated processor communicating over a suitable interface therewith. Alternatively, the sub-processors 708, 710, 712 and/or memory components 704 or 706 can be integrated in any other fashion in a computing device such as computing device 600 in FIG. 5.

Each sub-processor may include an operating system module 722, a communication module 724, and one or more applications 726, where each of these modules and applications correspond to a set of instructions for performing one or more functions described above and the methods described in the disclosure (e.g., the computer-implemented methods and other data processing methods described herein).

The operating system 722 can include various procedures, sets of instructions, software components, and/or drivers for controlling and managing general system tasks (e.g., memory management, storage device control, power management, etc.) and facilitates communication between various hardware and software components.

The communication module 724 facilitates communication with other devices using the communications circuitry 716 and includes various software components for handling data received from the RF circuitry 718 and/or the port 720.

In some embodiments, the communication circuitry 716, the CPU 702 and the one or more sub processors 708, 710, 712 may be implemented on a single chip. In some other embodiments, they may be implemented on separate chips.

FIG. 8 is a block diagram depicting a user interface 800, such as a graphical user interface for use in the above described aspects and embodiments of the disclosed method. The graphical user interface 800 is provided with a number of modules, each may be implemented as an interface button or a display area or a text or image interface area which may be engaged with by a user using a keyboard or via touch sensitive input associated with the user interface 800. A device status module 802 is configured to present or trigger a request for presentation of data in relation to the current state of one or more devices in a user network, such as the user network 400 in FIG. 4. The device alert module 804 is configured to provide an indication of any notifications, messages, alerts of untimely or unusual access etc, in relation to the one or more devices in the user network. A device control module 806 is provided for enabling the user to provide one or more control instructions and commands to the one or the devices. In some embodiments, this may result in a change of state for a particular device. A query display and response module 808 is provided to enable display of a query for authorisation and enable input and submitting of a response to the query. Other modules may also be present in the user interface 800 for enabling display and interaction with data relating to the devices in the user network.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "creating", "providing", "calculating", "computing," "determining", "identifying", "comparing", "establishing", "sending", "receiving", "storing", "authorising", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method comprising:
receiving, by a computer system communicatively coupled to a communication network, from a first device among a plurality of devices operating in the communication network, a request to perform an operation at the first device, wherein the plurality of devices are associated with a user;
determining, by the computer system, whether the received request satisfies a first criterion for verifying authorization to perform the operation at one or more devices, the first criterion being based on a data model, the data model being generated based on a plurality of patterns of actions for at least one device among the plurality of devices, the plurality of patterns of actions including at least one regular pattern of action corresponding to an operating state of the at least one device, wherein the at least one regular pattern of actions is based on a user pattern of actions associated with the at least one device among the plurality of devices;
based on a determination that the first criterion is not satisfied, generating, by the computer system, at least one query to determine authorization to perform the operation at the one or more devices, the at least one query based on one or more patterns of actions of at least one device among the one or more devices;
determining, by the computer system, whether a response to the at least one query received from the user via a second device satisfies a second criterion for satisfying the at least one query, the second criterion being satisfied based on a comparison of the response to the at least one query to the one or more patterns of actions associated with the at least one query in the data model; and
based on a determination that the second criterion is satisfied, sending a message that causes the first device to permit performance of the operation at the first device, the message including an authorization to perform the operation and a setting for the first device to perform the operation based on the authorization.

2. The method of claim 1, further comprising:
causing, by the computer system, the at least one query to be displayed in a graphical user interface at the second device, the graphical user interface including one or more elements configured to receive input responsive to the at least one query;
wherein the second device is a trusted mobile device associated with a user identifier that is registered for the communication network.

3. The method of claim 2, wherein receiving the request for the operation includes:
receiving a signal from an interface associated with the first device; or
receiving a signal from an interface associated with another device among the plurality of devices in the communication network; or
receiving a signal from a user interface associated with the second device or a graphical interface associated with a mobile computing device that is capable of communication with a server computer and/or one or more of the plurality of devices in the communication network; or
receiving a signal from an application running on a mobile computing device.

4. The method of claim 2, wherein the graphical user interface is configured for providing or displaying data relating to current operating states of the plurality of devices in the communication network.

5. The method of claim 1, further comprising: generating the data model based on a plurality of patterns of actions for one or more devices among the plurality of devices operating in a communication network, the plurality of devices communicatively coupled to a server computer, the data model detecting at least one regular pattern of actions for each device among the one or more devices, each action of the at least one regular pattern of actions corresponding to an operating state of the respective device.

6. The method of claim 1, wherein the first criterion is a determination that one or more states of a regular pattern of actions stored for the first device in the data model is detected in the received request.

7. The method of claim 1, wherein the second criterion is a determination that one or more states of a regular pattern of actions stored in the data model for the at least one device associated with the at least one query is detected in the received response.

8. The method of claim 1, wherein causing the first device to permit performance of the operation comprises:
determining whether the received response to the at least one query is a complete or partial match to the regular pattern of actions associated with the at least one query;
based on a determination of a complete match, generating a setting to allow the operation in the received request in an unlimited form; and
sending the generated setting to the first device and/or a server computer.

9. The method of claim 1, wherein causing the first device to permit performance of the operation comprises:
determining whether the received response is a complete or partial match to the regular pattern of actions associated with the at least one query;
based on a determination of a partial match, generating a setting to partially allow the operation in the received request in a limited form; and
sending the generated setting to the first device and/or a server computer.

10. The method of claim 9, wherein generating the setting to partially allow the operation in the received request in a limited form comprises:
generating a data structure associated with the data model, the data structure including a hierarchy of predetermined tolerance levels relating to a given regular pattern of actions of a given device among the plurality of devices;
for each predetermined tolerance level, defining an access limit or control limit for one or more states in the given regular pattern of actions of the given device;
upon the determination of a partial match in the received response, identifying a predetermined level of tolerance for the first device that corresponds to the partial match;
creating a function to implement the access or control limit associated with the identified predetermined level of tolerance; and
generating a setting to implement the created function for the first device.

11. The method of claim 1, wherein receiving the request for the operation includes:
receiving a signal from an interface associated with the first device; or
receiving a signal from an interface associated with another device among the plurality of devices in the communication network; or
receiving a signal from a user interface associated with the second device or a graphical interface associated with a mobile computing device that is capable of communication with a server computer and/or one or more of the plurality of devices in the communication network; or
receiving a signal from an application running on a mobile computing device.

12. The method of claim 1, wherein receiving a request for an operation includes:
receiving the request by a server computer; or receiving the request by a processor associated with the first device.

13. The method of claim 1, wherein the communication network is an IoT communication network and the plurality of devices are IoT devices that are previously configured to/authenticated for operation in the IoT communication network.

14. An apparatus communicatively coupled to a communication network, the apparatus comprising:
at least one memory; and
at least one processor coupled to the at least one memory and configured to:
receive from a first device among a plurality of devices operating in the communication network, a request to perform an operation at the first device, wherein the plurality of devices are associated with a user;
determine whether the received request satisfies a first criterion for verifying authorization to perform the operation at one or more devices, the first criterion being based on a data model, the data model being generated based on a plurality of patterns of actions for at least one device among the plurality of devices, the plurality of patterns of actions including at least one regular pattern of action corresponding to an operating state of the at least one device, wherein the at least one regular pattern of actions is based on a user pattern of actions associated with the at least one device among the plurality of devices;
based on a determination that the first criterion is not satisfied, generate at least one query to determine authorization to perform the operation at the one or more devices, the at least one query based on one or more patterns of actions of at least one device among the one or more devices;
determine whether a response to the at least one query received from the user via a second device satisfies a second criterion for satisfying the at least one query, the second criterion being satisfied based on a comparison of the response to the at least one query to the one or more patterns of actions associated with the at least one query in the data model; and
based on a determination that the second criterion is satisfied, send a message that causes the first device to permit performance of the operation at the first device, the message including an authorization to perform the operation and a setting for the first device to perform the operation based on the authorization.

15. The apparatus of claim 14, wherein the at least one processor is further configured to:
cause the at least one query to be displayed in a graphical user interface at the second device, the graphical user interface including one or more elements configured to receive input responsive to the at least one query;
wherein the second device is a trusted mobile device associated with a user identifier that is registered for the communication network.

16. The apparatus of claim 15, wherein, to receive the request for the operation, the at least one processor is configured to:
receive a signal from an interface associated with the first device; or
receive a signal from an interface associated with another device among the plurality of devices in the communication network; or
receive a signal from a user interface associated with the second device or a graphical interface associated with a mobile computing device that is capable of communication with a server computer and/or one or more of the plurality of devices in the communication network; or
receive a signal from an application running on a mobile computing device.

17. The apparatus of claim 15, wherein the graphical user interface is configured for providing or displaying data relating to current operating states of the plurality of devices in the communication network.

18. The apparatus of claim 14, wherein the at least one processor is further configured to: generate the data model based on a plurality of patterns of actions for one or more devices among the plurality of devices operating in a communication network, the plurality of devices communicatively coupled to a server computer, the data model detecting at least one regular pattern of actions for each device among the one or more devices, each action of the at least one regular pattern of actions corresponding to an operating state of the respective device.

19. The apparatus of claim 14, wherein the first criterion is a determination that one or more states of a regular pattern of actions stored for the first device in the data model is detected in the received request.

20. The apparatus of claim 14, wherein the second criterion is a determination that one or more states of a regular pattern of actions stored in the data model for the at least one device associated with the at least one query is detected in the received response.

* * * * *